(12) United States Patent
Mabey (10) Patent No.: US 10,364,185 B2
(45) Date of Patent: Jul. 30, 2019

(54) LIGHT-WEIGHT, FIRE-RESISTANT COMPOSITION AND ASSEMBLY

(71) Applicant: Michael John Mabey, Sherwood Park (CA)

(72) Inventor: Michael John Mabey, Sherwood Park (CA)

( * ) Notice: Subject to any disclaimer, the term of this patent is extended or adjusted under 35 U.S.C. 154(b) by 0 days.

(21) Appl. No.: 15/932,638

(22) Filed: Mar. 28, 2018

(65) Prior Publication Data

US 2018/0282218 A1   Oct. 4, 2018

Related U.S. Application Data

(60) Provisional application No. 62/601,911, filed on Apr. 3, 2017.

(51) Int. Cl.
*C04B 28/06* (2006.01)
*C04B 18/02* (2006.01)
(Continued)

(52) U.S. Cl.
CPC .............. *C04B 28/065* (2013.01); *C04B 9/02* (2013.01); *C04B 9/04* (2013.01); *C04B 16/0675* (2013.01);
(Continued)

(58) Field of Classification Search
CPC ..... C04B 28/065; C04B 18/027; C04B 28/06; C04B 28/14; C04B 28/32; C04B 9/02;
(Continued)

(56) References Cited

U.S. PATENT DOCUMENTS 1,059,661 A   4/1913   Edison
3,226,240 A   12/1965  Crowley
(Continued)

FOREIGN PATENT DOCUMENTS

CA   2999580 A1   10/2018
EP   727550 A1   7/1998
(Continued)

OTHER PUBLICATIONS

Mabey, Michael John, "Light-Weight, Fire-Resistant Composition and Assembly," U.S. Appl. No. 62/601,911, filed Apr. 3, 2017 A.D.
(Continued)

*Primary Examiner* — Peter F Godenschwager
*Assistant Examiner* — Andrew J. Oyer
(74) *Attorney, Agent, or Firm* — Christopher John Rudy (57) ABSTRACT

Light-weight, fire-resistant "mineral foam" includes an inorganic cementitious matrix and at least one metal hydrate that is a "super hydrate" substance, in which water is present with the substance in an amount of at least about ten moieties of water of hydration per formula unit of the substance. As a cured solid, that "mineral foam," or another mineral foam composition including an inorganic cementitious matrix, can be provided as a structural member in part of an assembly that has at least one open web, thermally insulating support member at least partially embedded in the cured solid. Also, the cured "mineral foam" may be a solid foam in a form of a panel, panel block or tile, which may have a tongue provision and/or a groove provision.

20 Claims, 4 Drawing Sheets

(51) Int. Cl.
| | |
|---|---|
| *C04B 28/14* | (2006.01) |
| *C04B 28/32* | (2006.01) |
| *C08L 75/04* | (2006.01) |
| *C04B 16/06* | (2006.01) |
| *C04B 9/04* | (2006.01) |
| *C04B 9/02* | (2006.01) |
| *C08L 21/02* | (2006.01) |
| *C04B 111/52* | (2006.01) |
| *C04B 111/28* | (2006.01) |
| *C04B 111/40* | (2006.01) |

(52) U.S. Cl.
CPC ............ *C04B 18/027* (2013.01); *C04B 28/06* (2013.01); *C04B 28/14* (2013.01); *C04B 28/32* (2013.01); *C08L 21/02* (2013.01); *C08L 75/04* (2013.01); *C04B 2111/28* (2013.01); *C04B 2111/40* (2013.01); *C04B 2111/52* (2013.01)

(58) Field of Classification Search
CPC ... C04B 9/04; C04B 16/0675; C04B 2111/40; C04B 2111/52; C04B 2111/28; C08L 21/02; C08L 75/04
See application file for complete search history.

(56) References Cited

U.S. PATENT DOCUMENTS

| | | | |
|---|---|---|---|
| 3,233,378 A * | 2/1966 | Crumbaugh | E04B 5/38 52/332 |
| 3,663,287 A * | 5/1972 | Mizunuma | C04B 28/02 106/820 |
| 3,719,512 A | 3/1973 | Danielis | |
| 3,816,147 A | 6/1974 | Vassileski | |
| 3,951,885 A | 4/1976 | Thompson | |
| 3,963,849 A | 6/1976 | Thompson | |
| 4,055,519 A | 10/1977 | Thompson | |
| 4,138,833 A | 2/1979 | Townend | |
| 4,158,570 A | 6/1979 | Irwin | |
| 4,209,339 A | 6/1980 | Smith-Johannsen | |
| 4,352,694 A | 10/1982 | Smith-Johannsen et al. | |
| 4,545,169 A | 10/1985 | Rizk | |
| 4,661,398 A | 4/1987 | Ellis | |
| 4,774,794 A | 10/1988 | Grieb | |
| 4,852,316 A | 8/1989 | Webb | |
| 5,039,454 A | 8/1991 | Policastro et al. | |
| 5,110,361 A | 5/1992 | Alley et al. | |
| 5,112,678 A | 5/1992 | Gay et al. | |
| 5,281,270 A | 1/1994 | Totten et al. | |
| 5,298,069 A | 3/1994 | King et al. | |
| 5,395,571 A | 3/1995 | Symons | |
| 5,462,623 A | 10/1995 | Day | |
| 5,561,998 A | 10/1996 | Bodnar | |
| 5,743,056 A | 4/1998 | Balla-Goddard et al. | |
| 5,767,178 A | 6/1998 | Kolker et al. | |
| 6,101,779 A | 8/2000 | Davenport | |
| 7,543,419 B2 | 6/2009 | Rue | |
| 7,658,795 B2 | 2/2010 | Caine et al. | |
| 7,744,693 B2 * | 6/2010 | Mabey | C04B 28/342 106/672 |
| 7,757,454 B2 | 7/2010 | Smith | |
| 7,765,756 B2 | 8/2010 | Bontrager, II | |
| 8,015,771 B2 | 9/2011 | LeBlang | |
| 8,066,812 B2 | 11/2011 | Wu et al. | |
| 2002/0100228 A1 | 8/2002 | Yoder | |
| 2003/0024290 A1 | 2/2003 | Bodnar et al. | |
| 2007/0062144 A1 | 3/2007 | Moon | |
| 2008/0178782 A1 | 7/2008 | Frobosilo et al. | |
| 2009/0107072 A1 | 4/2009 | Bowman et al. | |
| 2018/0282218 A1 | 10/2018 | Mabey | |

FOREIGN PATENT DOCUMENTS

| | | |
|---|---|---|
| EP | 0635088 B1 | 10/2000 |
| EP | 2234796 A2 | 6/2015 |
| GB | 5022 | 10/1824 |
| WO | WO 92/21834 A1 | 12/1992 |
| WO | WO 01/33006 A1 | 5/2001 |
| WO | WO 2007/102830 A1 | 9/2007 |

OTHER PUBLICATIONS

ASTM E119—00a, "Standard Test Methods for Fire Tests of Building Construction and Materials," 2000.
Building Code 2015 of Utah//CODE SNIPPET, "Section 703 Fire-Resistance Ratings and Fire Tests," up.code/s/fire-resistance-ratings-and-fire-tests, printed Nov. 12, 2018.
Paintal et al., CAN/ULC-S101-04 Certification Bulletin 2009-31, Jan. 4, 2010.
UL Online Certifications Directory, BXUV7.GuideInfo, Fire-resistance Ratings—CAN/ULC-S101 Certified for Canada, 2013.
ULC Standards, ULC CAN4-S124, Jun. 1985, notice of being superceded by ULC CAN-S124, with abstract of ULC CAN-S124, Jun. 2018—both printed Nov. 12, 2018.
Qiao et al., "The Application Review of Magnesium Oxychloride Cement," J. Chem. Pharm. Res., 2014, 6(5):180-185.
ASTM E84, Revision 18B, Oct. 1, 2018, Description/Abstract, printed Nov. 12, 2018.
Peng, "Thermal Analysis Study of the Natrolite Group," Dept. of Geology, Columbia University, New York, N.Y., 1954.

* cited by examiner

LIGHT-WEIGHT, FIRE-RESISTANT COMPOSITION AND ASSEMBLY

This claims priority benefits under 35 USC 119(e) of U.S. provisional patent application No. 62/601,911. The same was filed on Apr. 3, 2017 A.D.

FIELD AND PURVIEW OF THE INVENTION

This concerns a light-weight, fire-resistant composition. It can be a "mineral foam," have an extremely light weight/light- or low-density, and be a non-combustible, open/closed cell, composition found with or as a cementitious matrix and may include a salt-stable latex, which may be foamed, say, with latex-based cellular foam. For example, it can include a mixture of metal hydrates having about from one or two to thirty-two moieties of water of hydration per formula unit such as found in magnesium hydroxide (MGH or brucite); alumina trihydrate (ATH); magnesium oxychloride octahydrate (MOC); magnesium oxysulfate (MOS); potassium aluminum sulfate dodecahydrate (potassium alum, commonly simply called "alum"); calcium sulfoaluminate triginta-duo hydrate (Ettringite), which is a special "super hydrate" that may be man-made; and so forth. The composition may be considered to be a nano-crystalline composite. Of concern as well is an assembly that can include such a composition, which can be light-weight, self-supporting and fire-resistant, and be employed with or as a wall, ceiling, floor, and so forth, and which, for example, can have a mineral foam core disposed in conjunction with structural skin panels of oriented strand board (OSB), plywood, cement board and/or magnesium- or gypsum-based sheathing products, and so forth and the like.

GENERAL BACKGROUND TO THE INVENTION

Mabey, U.S. Pat. No. 7,744,693 B2 (Jun. 29, 2010), discloses lightweight composite materials and methods. Disclosed therein is a lightweight "mineral foam" composite, based on a reaction between mono-ammonium phosphate (MAP) and heavily burned, thus very low reactivity, magnesium oxide (MgO). The magnesium phosphate cement (MOP cement) product—which can contain a burnt coal residue such as fly ash, a low cost material—is effective as an insulating building material in blocks or panels; but, although it is fire-resistant, lacks a really high level of fire resistance and thus, while resistant to elevated temperatures, may not pass a North American Building Code mandated fire test such as the ASTM E-119 or ULC CAN4-S101 fire tests of building construction and materials, or the CAN/ULC-S124 test for thermal barrier fire protection of foamed plastic in a cost-effective manner.

Various other cementitious compositions are known, and desired for application in building construction. See, e.g., British Patent No. 5022 (Oct. 11, 1824) to Aspdin for artificial stone; U.S. Pat. No. 1,059,661 (Apr. 22, 1913) to Edison for manufacture of Portland cement; U.S. Pat. No. 3,226,240 (Dec. 28, 1965) to Crowley for a calcium aluminate cement composition; U.S. Pat. No. 4,352,694 (Oct. 5, 1982) to Smith-Johannsen et al. for a process of producing Sorel cement; U.S. Pat. No. 5,110,361 (May 5, 1992) to Alley et al. for magnesium oxychloride cement compositions and methods for manufacture and use; Caine et al., U.S. Pat. No. 7,658,795 B2 (Feb. 9, 2010) for magnesium oxychloride cement; and U.S. Pat. No. 8,066,812 B2 (Nov. 29, 2011) to Wu et al. for durable magnesium oxychloride cement and process thereof. Indeed, in Wu et al., in order to reduce the impact of carbonation on the long-term strength of a magnesium oxychloride cement (MOC cement) complex, included is an exfoliated vermiculite in a Sorel cement mix such as that disclosed in the patents mentioned above to Smith-Johannsen et al., which teaches the addition of phosphoric acid or its soluble salts as a means of improving the water resistance of a MOC cement, and to Alley et al., which teaches the addition of hydrochloric acid in order to make a MOC cement that is a durable concrete repair material. Such cementitious compositions, among other things, may have value in retarding the spread of fire in commercial or residential construction.

It is known, too, that certain cementitious compositions can be combined with metallic elements for reinforcement, support, and so forth. For example, ferrous reinforcing rod and mesh are well known adjuncts to various cementitious compositions such as Portland cement based concrete. Other metallic elements may include metal C-studs embedded in a mineral foam matrix such as disclosed by the aforementioned patent to Mabey.

The Mabey patent also discloses embedding a wooden stud in a mineral foam matrix.

Further enhancements perhaps may be made by the addition fibrous materials, such as man-made fibers, flax or hemp fibers and fines, oat husks and rice hulls. These may serve to 'bulk up" a wet slurry without adding significant weight and/or improve the bending strength, flexural strength and compressive strength of the dried and cured composite matrix.

As good as they are, such cementitious materials and their combinations, to include those employing metallic adjuncts, are not without drawbacks. Among these, in certain cases, is a propensity to corrode metallic elements placed in contact with the set cement; in others is a lack of fire resistance; and in other cases is a loss of strength with long term exposure to moisture such as may be the case with MOC cement and magnesium oxysulfate cement (MOS cement). See, e.g., Qiao et al., "The application review of magnesium oxychloride cement," *J. Chem. Pharm. Res.*, 2014, 6(5):180-185.

While the foregoing improvements are obviously beneficial, it would be desirable to provide a composition having a reduced weight or density and/or having further improved fire resistance compared to such known products, to include not only the MOP cement product of Mabey but also MOC cement and other cements, to include MOS cement, to include as mentioned above. It would be desirable to provide a lightweight, structural assembly having a very high level of fire-resistance, and provide a construction material with improved functional properties. In general, it would be desirable to ameliorate if not eliminate one or more of such drawbacks and others known in the art. It would be desirable to provide the art an alternative.

A FULL DISCLOSURE OF THE INVENTION

Provided hereby, in one general aspect, is a lightweight, fire-resistant composition.

The composition can be inorganic, for example, of a mineral foam type, and have an extremely light weight/light density. It can be formed by providing a nano-crystalline composite, and employed to create an assembly which can be a light-weight, self-supporting assembly for a wall a ceiling, to include, as examples, an interlocking block system or board stock system, and so forth, which otherwise may have, for example, a "mineral foam" core disposed in conjunction with structural skins of OSB, plywood, cement board, or magnesium-based sheathing products, and so forth. For instance, the composition can be a non-combustible, open or closed cell, "mineral foam" with a cementitious matrix and/or salt-stable latex, which may be foamed to form a latex-based cellular foam, for example, including a mixture of metal hydrates having about from one or two to thirty-two moieties of water of hydration per formula unit such as in MGH, ATH, MOC, MOS, alum, Ettringite, and so forth.

Accordingly provided in one embodiment is a "mineral foam" comprising a light-weight, non-combustible, closed cell, mineral foam, formed into a cementitious matrix, which may include a salt-stable latex, and which may be foamed, to form the "mineral foam." For example, the mineral foam can include a mixture of metal hydrates having about from two to thirty-two moieties of water of hydration per formula unit such as found in MGH, ATH, MOC, MOS, alum, even Epsom salt, plus Ettringite, and so forth. Such metal hydrates serve to increase the water of crystallization in Sorel or other cement matrices, which serves to improve the fire resistance rating of the material or assembly, say, in units of hours of fire resistance, and/or reduce the overall weight of the material or assembly in which it is formed, say, in units of pounds, kilograms or grams per inch or centimeter of thickness. And in another embodiment, provided is a fire-resistant assembly, which comprises a lightweight, self-supporting assembly, which has a mineral foam core disposed in conjunction with an open web galvanized steel stud framework. The assembly can be for a wall, ceiling, floor and so forth. The mineral foam core can be of an open celled mineral foam structure, for instance, as in the aforementioned patent to Mabey based on fly ash or otherwise disclosed herein and/or a closed cell mineral foam structure such as formed by combining a salt stable latex polymer with water and a foaming agent which is added to or blended into the wet cement slurry during production. The open web metal stud framework can be one such as made with rolled galvanized steel, for example, as commercially available as DeltaStud material from SteelForm Incorporated of Edmonton, Canada, which is an open web metal stud, which may be made according to U.S. Pat. No. 5,561,998 (Oct. 8, 1996) to Bodnar for a rotary forming apparatus and method; and Pub. No. US 2003/0024290 A1 (Feb. 6, 2003) by Bodnar et al. for a variable width roll forming apparatus. Nonetheless, conventional studs, to include those made from wood or metal, for example, metal C-studs, may be employed. Also employable, especially within the cementitious matrix, is(are) additional component(s) such as structurally reinforcing and/or filler material(s) such as glass fibers; mineral fibers, sheets or particles, to include mica in sheets, flakes or processed form such as an expanded mica, say, vermiculite; plastic resins in sheets, strips, or particles, to include beads and flakes, and which may be foamed or non-foamed; plant fibers, seed husks, hulls or shells, to include wood particulate product(s), wood-product sheet(s) and/or agricultural waste such as hemp or flax fibers and/or fines, rice husks and/or oat hulls; and so forth and the like. Thus, an advanced precast, hybrid mineral foam and metal stud panel assembly is provided, advantageously to include with a light-weight, noncombustible, closed-cell mineral foam.

The invention is useful in construction. It may be employed as a fire-resistant material or both a fire-resistant and fire-retardant material, and so forth.

Significantly, by the invention, the art is advanced and improved in kind, with one or more of the aforesaid drawbacks ameliorated if not eliminated, and the art provided with an alternative. A lightweight, fire-resistant composition and a lightweight, fire-resistant assembly are provided. Provided as well is a construction material with improved properties. Notably obtained are unexpected, synergistic performance improvements in a lightweight, non-combustible, structural, insulated wall assembly, for example, by combining the lightweight composite mineral foam of the aforesaid Mabey patent with an open web, light gauge, roll-formed, steel studs to provide a structural wall panel to produce a finished product, say, as a precast wall assembly with excellent thermal resistance, wind load, and structural properties, which meets or exceeds a number of fire codes. For example, the composition and/or assembly may pass North American Building Code mandated fire tests such as the ASTM E-119 Standard Test Methods for Fire Tests of Building Construction and Materials or CAN/ULC-S101 Fire Endurance Tests of Building Construction and Materials, the CAN/ULC-S124 Thermal Barrier Fire Protection of Foamed Plastic test, and/or the well-known ASTM E-84 Standard Test Method for Surface Burning Characteristics of Building Materials. Moreover, significant improvement to the fire resistance of otherwise known wall assemblies can be obtained. For example, a mineral foam composite from the aforementioned Mabey patent is significantly enhanced by substituting the fly ash and/or MOP mix with a blend of other cementitious composites such as, for example, MOC, MOS, even magnesium sulfate septa-hydrate (Epsom salt, which can be reacted with magnesium oxide to form MOS), other Sorel cements and/or Ettringite, with its thirty-two waters of hydration, used as functional filler(s) to produce a mineral foam composite with a high average water of hydration per unit formula in the matrix once set and cured, for one example, about from of twenty-four to twenty-six moles of water of hydration per unit formula. This additional water of hydration improves fire resistance to an exceptional degree, to include improved fire resistance ratings over the magnesium phosphate mineral foam composite of the aforementioned Mabey patent or others in the prior art based solely on magnesium phosphate (MOP), MOC, or MOS, themselves mentioned multiple times in prior art as fire-resistant or fire-retardant sprays, composites or panels. Accordingly, present embodiments may be considered to be directed to compositions and/or assemblies having improved fire resistance ratings in comparison to the light-weight mineral foam composite of the aforementioned Mabey patent, and, where applicable, to the products of the aforementioned patents to Alley et al., Caine et al., Wu et al., and others. And, as a precast assembly—for example, for a wall, say, made with the light-weight, noncombustible, closed-cell mineral foam including the latex polymer—it can be an exceptionally light-weight, structurally sound, thermally insulating, fire-resistant and sound-dampening product, and offer not only enhanced potential for government, foundation, or insurance monies or credits as may be appropriate or available, such as LEED credits, but also huge savings in time and manpower when making a building, especially for medium to large commercial construction projects. Moreover, if the composite core, say, of a two- to three-inch thickness, is biased to one side in a wall assembly during fabrication of a seven-inch to ten-inch thick wall, a cavity can remain within the assembly, which can be filled with a closed cell polyurethane foam to add insulation values, say, to ensure even R-30 insulation value, in a hybrid, precast, insulated, fire-rated wall assembly. Overall, the invention is efficient to make and use.

Such significant improvements, along one line of advance, can be attributed to the recently discovered means of making inorganic composite complex products alluded to above, which, during reaction and completion, produces a "super hydrate" that can have, depending on the temperature during the reaction and drying phase, even about from twenty-one to thirty-two moles of water of hydration per formula unit trapped in the dry composite matrix, which can represent up to 50% of its dry weight as filler. Thus, for example, the mineral foam of the Mabey patent does little to quench a fire, or cool a substrate during exposure to fire, which would be important in obtaining higher fire-resistance ratings under local, state, provincial, regional, or national codes since its MOP cement foundation has little water of hydration, whereas the MOC and MOS cements have a higher, but generally less sufficient, level of water of hydration to quench a fire or cool a substrate during exposure to a fire for any significant amount of time. The addition of the "super hydrate" compound(s) can help remedy such deficiencies. Along another line of advance from the noted development of new means to obtain "super hydrate" materials, as also alluded to above, a new line of lightweight, open web, light gage galvanized steel studs have become available, and these new studs, and/or conventional wooden and/or metal studs, e.g., the metal C-studs, which can improve the overall functionality as in a precast wall assembly of this invention.

This new "super hydrate" and its employment can be illustrated in a number of ways:

Illustration 1

As an additive, substantial enhancement of the fire resistance rating of the mineral foam composite of the aforementioned Mabey patent can be provided such that the water of hydration values may go from the previously known hemi-hydrate or at best a di-hydrate to an average of an octahydrate or a decahydrate by substituting all or a portion of its filler, for example, fly ash, with the "super hydrate." Thus, a synthetic "super hydrate" can be produced from or with a blend, reaction or mix such as follows, with parts and percentages by weight:

About from 800 to 1400 parts, e.g., about 1250 parts, monocalcium aluminate ($CaAl_2O_4$, $CaO$—$Al_2O_3$);

About from 500 to 700 parts, e.g., about 625 parts, calcium sulfate hemi-hydrate ($2CaSO_4$-½$H_2O$);

About from 60 to 140 parts, e.g., about 100 parts, calcium oxide ($CaO$);

About from 650 to 1600 parts, e.g., about 1200 parts, water, liquid ($H_2O_{(l)}$));

About from 5 to 40 parts, e.g., about 36 parts, xanthan gum, e.g., Kelsan or Kelsan S—from CP Kelco, a Huber Company, U.S.A., dissolved in the water (above);

About from 600 to 1600 parts, e.g., 800 parts, styrene-butadiene rubber (SBR)-based latex polymer, e.g., Planicrete Latex from MAPEI Inc., U.S.A.;

About from 10 to 100 parts, e.g., 25 parts, foam generator, e.g., a foam generating soap otherwise used in making cellular concrete, say, sodium lauryryl sulfate, i.e., $CH_3(CH_2)_{11}$—$SO_4Na$, at about from 2% to 5% in solution of water, e.g., CF 700 foam generating soap from Unifoam Ltd., Mississauga, Ontario, Canada;

About from 10 to 100 parts, e.g., 30 to 50 parts, oxygen source, say, hydrogen peroxide, e.g., about 22% hydrogen peroxide in water ($H_2O_{2(aq)}$), readily available commercially, say, from an industrial cleaning supply store.

The dry ingredients are available at an extremely fine particle size, for example, 200 mesh or finer, and these are added to the water, latex polymer and soap mix and mixed at high sheer until a uniform slurry is made. Next, the $H_2O_2$ is added and stirred in at low shear to ensure adequate dispersion through the wet mix. This results in the formation of a light-weight compound generally according to the elemental formula, $Al_2Ca_6H_{64}O_{50}S_3$, generally with 26 to 32 moles of chemically bound water per formula unit depending on the temperature at which it is reacted, cured and dried; plus residues of the SBR polymer, which functions to trap oxygen being released during the decomposition of the $H_2O_2$, forming free oxygen to puff up the super hydrated composite and prevent such oxygen from escaping the wet slurry and collapsing the foamed matrix until such time as the wet slurry has formed a rigid lightweight cellular matrix. The wet mix is cast into an open pan and allowed to set and then dry to constant mass. The dried, friable foamed composite can be readily pulverized to produce a fine granular functional filler that replaces the fly ash in the mineral foam of the aforementioned Mabey patent and results in a substantial increase in the fire resistance of the old magnesium phosphate mineral foam by virtue of the very high content of the water of hydration from this "super hydrate." Loading of this replacement functional filler can be approximately the same as the fly ash loading of the mineral foam of the Mabey patent, say, about from 15% to 55% of total weight, in order to provide a "mineral foam" of the present invention.

Illustration 2

Structural fibers or mats are added to the mix set forth in Illustration 1 to form upgraded mineral foam composite sheet stock. The upgraded sheet stock can be used to enhance the fire resistance rating of a composite wall assembly by being layered in a wall assembly between sheets of drywall such as gypsum board, other board stock or insulation, to enhance the overall fire resistant performance of the wall or floor, or laid in above a mineral based ceiling tile to enhance the fire resistance rating of the ceiling assembly.

Illustration 3

A "super hydrate" as of Illustration 1 can be used as functional filler in other cement/binder systems, including, for example, Gyperete gypsum-containing concrete, normal Portland cement, calcium sulfate dihydrate, i.e., gypsum drywall, MOC cement, MOS cement, magnesium phosphate cements, and/or foamed or aerated versions of mixes of the same, and so forth, to improve the overall fire resistant performance of each afforded by the contribution of the chemically bound water from the "super hydrate." Loading may be about from 5% to 50%, to include about from 10% to 40% and 20% to 30%, by total weight of the cement slurry, depending on any other filler(s) and intended use, and yet provide significant advantage in terms of improving the fire resistant performance of the cured cement-composite matrices.

Tests according to the ASTM E-119 (ULC CAN4-S101) fire tests show effects and fire resistance ratings from various metal hydrates or lack thereof. For example, different MOC mixes with identical amounts of different functional fillers, or without filler, show differing thermal resistance values:

| SAMPLE | TIME TO 375° F. | MAXIMUM TEMPERATURE AT 90 MINUTES |
|---|---|---|
| MOC Cement with Calcium Sulfate (Gypsum Powder) | 64 Minutes | 628.7° F. |
| MOC Cement with ATH | 78 Minutes | 472.6° F. |
| MOC Cement without Functional Filler | 81 Minutes | 447.2° F. |
| MOC Cement with "Super Hydrate" of Illustration 1 | 95 Minutes | 363.2° F. |

The maximum average cold face temperature allowed per the fire tests is 375° F. above ambient. Accordingly, it is beneficial to keep the cold face below this allowable limit for as long as possible in order to gain the best fire resistance rating. From this illustration, gypsum powder as a functional filler shows to be the least effective filler. The addition of ATH yields substantially better results than the addition of gypsum powder based on temperature of the cold face after 90 minutes (472.6° F. vs 628.7° F.). The MOC cement without functional filler is better than the preceding two samples according to cold face temperature after 90 minutes (447.2° F. compared to 472.6° F. and 628.7° F.). But, far and away, the best result based on a cold face temperature at 90 minutes is from using the synthetic Etttringite, e.g., the "super hydrate" of Illustration 1, as a functional filler (363.2° F. compared to 447.2° F., 472.6° F. and 628.7° F.), which is 84.0° F. lower than the best value with the MOC cement without functional filler, and which never reached the maximum temperature for a 90-minute rating. The time the MOC cement with Ettringite took to reach the 375° F. was an assuring 14 minutes longer than it took the second-place finisher, MOC cement without functional filler. Thus, in a 90-minute fire test, a 20% improvement in overall fire performance is provided when compared to the second-place-finishing MOC cement alone common in the prior art. Comparable results can be expected for longer tests with thicker cores.

Illustration 4

When used in combination with an open web, light gage galvanized steel stud, such as those disclosed in the aforementioned patent to Bodnar and/or patent application of Bodnar et al., and/or in combination with 2×4 or 2×6 and so forth and the like wooden studs or 2×4 to 2×10 and so forth standard galvanized steel C-studs and the like such as made from a solid strip of 12-gage to 22-gage galvanized steel with solid webs to provide for rigidity and structural support of a proposed composite wall assembly and such as found in the aforementioned patent to Mabey, the wet composite—bound within a Phase 5 (1:5:12.5) MOC cement combined with about from 5% to 50% by weight "super hydrate" as a functional filler, aerated and having latex polymer(s) and water-based soap foam blend(s)—common to those use in cellular concrete—yields a functional, light-weight "mineral foam," as an about from 22 to 44 lbs. per cubic foot, fire-resistant MOC cement foam composite wall panel assembly exhibiting much improved fire resistance over MOC cement alone by virtue of the addition of the 21 to 32 moles of water per formula unit held in the "super hydrate" such as of Illustration 1. The "super hydrate" could be micronized and added to one or more of these cement slurry mixes at a loading about from 5 to 50%, to include about from 10% to 40% and 20% to 30%, by total overall weight of the wet cement slurry mix. Such a wall or floor assembly provides more than two hours of fire resistance when tested according to the ASTM-E119 or equivalent, e.g., ULC CAN4-S101, fire tests based on two inches or less total thickness of the present MOC, super-hydrate-enhanced, cement foam composite in the wall assembly.

FURTHER DISCLOSURE

Herein, unless stated or the context indicates otherwise, as commonly understood in the art, the term, "Sorel cement," includes not only MOC cement but also MOP and MOS cements. The term, "super hydrate," with or without quotation marks, indicates a substance having water that is chemically combined with the substance to form a hydrate and can be expelled, for example, by heating, in general terms without essentially altering the composition of the substance, in which the water is present with the substance in an amount of at least ten or thereabout, preferably at least about twelve or thereabout and as an alternative more than twelve or thereabout, more preferably at least fifteen or thereabout, desirably at least twenty or thereabout, more desirably at least twenty-five or thereabout, especially at least thirty or thereabout moieties of water of hydration per formula unit, and, although the substance may comprise any suitable hydrate(s), metal hydrate(s) is(are) beneficially employed, one example satisfying all criteria being Ettringite with its two metal moieties and thirty-two waters of hydration per formula unit ($3CaO-Al_2O_3-3CaSO_4-32H_2O$). And, in the written descriptions, quotation marks around the term, "mineral foam," or, in the claims, use of the hyphenated, compound word, "mineral foam," without quotation marks, are intended to delineate a mineral foam composition of the present invention.

The present invention offers a number of advantages not heretofore available, to include:

$1^{st}$: A fire-rated wall assembly offering configuration or design advantages in which the wall can be made with service cavities on either side of the wall such as for wiring, plumbing and/or insulation, without creating any perforation in a normally fire-resistant member having gypsum, which would otherwise compromise fire resistance as in a conventional drywall or gypsum board wall assembly. This uninterrupted fire resistant core provides improved fire resistance compared to conventional drywall and steel studs as the one or more sheets of drywall on either side of that wall assembly are normally cut through (perforated) to install electrical boxes or plumbing fixtures. Since gypsum board provides substantially all the fire protection in a conventional assembly, any perforation in that gypsum board member tends to compromise the fire resistance rating of the wall assembly since the heat of a fire would escape into the wall cavity through these perforations and reduce the fire resistance rating of the wall assembly.

$2^{nd}$: A structural wall assembly that offers superior thermal performance owing to the unique nature of the thermal studs, which forms another novel element of the wall assembly. These thermal studs are roll formed to produce an open web with delta shaped voids formed though the web, which provides for improved rigidity and which also reduces the thermal transfer from the outside face to the inside face of the wall assembly due to the reduction in surface area across the metal web being a reduction of about from 60% to 80% of the surface area when compared to a conventional roll formed light weight steel stud with a solid web.

$3^{rd}$: A structural wall assembly that offers superior performance owing to such a thermal stud, which allows a wet "mineral foam" slurry to flow through the voids and upon curing form a rigid, composite wall assembly with improved fire resistance, even when compared to a standard light gage roll-formed "C-stud," which transfers heat from hot to cold faces more rapidly through its solid galvanized steel web. Thermal studs have up to 80% of the steel otherwise in the web removed to reduce surface area and heat transfer through the web from one face to the other by as much as 80%.

4$^{th}$: A lightweight "mineral foam" composite core, which can be situated mid-point in the wall assembly or biased to one face. When placed at mid-point, symmetry is introduced to make for a uniform fire-resistance rating regardless of which side is considered as the inside face. In fact, many fire code situations require a symmetrical wall assembly because a fire may start on either side of the fire-rated wall, and the fire protection must be equal for, or from, either side.

5$^{th}$: A lightweight, self-supporting, nano-composite "mineral foam" core featuring a unique combination of metal hydrates in a variety of cementitious binders such as normal Portland cement, calcium aluminate cement, and MOP, MOC or MOS cements, which provides much improved fire performance, when compared with using any of these cementitious binders alone—without the addition of the metal hydrates.

6$^{th}$: A lightweight, self-supporting, nano-composite "mineral foam" core with a unique combination of metal hydrates in a nano-composite binder made from a MOP, MOC, or MOS cement matrix including addition of a man-made "super-hydrate," for example, Ettringite. This provides much improved fire performance when compared with a regular cementitious binder alone since the water of hydration must be dehydrated at elevated temperatures to cool the mineral foam core and enhance the fire resistance rating of the assembly in which it resides.

7$^{th}$: A lightweight, self-supporting, nano-composite "mineral foam" core with a unique combination of metal hydrates in a nano-composite binder made from a MOP, MOC or MOS cement matrix including addition of a man-made "super-hydrate," for example, Ettringite, wherein the "mineral foam" composite is used as a fire resistant core for installation and manufacture of fire rated passage doors, commonly rated as 20-, 45-, 60-, or 90-minute doors. This lighter weight, more fire resistant core provides much improved fire performance when compared with regular, aerated gypsum/cement/fibrous cores common to the industry and prior art. The lower weight translates into reduced costs of production, shipping, and installation.

8$^{th}$: A lightweight, self-supporting, nano-composite "mineral foam" core that utilizes a blend of "salt stable" latex polymers, which enhance modulus of elasticity (MOE) and modulus of rupture (MOR) properties that characterize compressive and bending strengths of the composite "mineral foam" core, when latex polymers are blended with the MOC, MOP or MOS salt solution after adding the requisite amount of MgO to form a 5-Phase MOC, MOP or a 7- to 11-Phase MOS cement, which can be readily aerated to reduce the density of the final product from about a 1800-kg/m$^3$ value down to as low as about a 300-kg/m$^3$ value. Such a low density foam provides for much lower weight and improved thermal resistance, for example, as measured by R-values, when used as the core in a lightweight composite wall assembly hereof.

9$^{th}$: With predetermined or precise selection of metal hydrate(s), significant improvement and/or synergistic effect on the fire resistance rating is achieved—based on colligative properties of the metal hydrate(s). This means that the wall assembly can be made up to about 60% lighter than would be the case if using traditional cementitious compounds and still provide superior fire and thermal resistance than solid forms of other cement-based materials at much higher densities.

10$^{th}$: The lightweight, noncombustible, closed-cell "mineral foam," among other things, has a reduced weight per cubic measure, an improved fire resistance rating when tested to the ASTM E-119 test method, an improved R-value, and greater flexibility in final assembly.

11$^{th}$: The "mineral foam" can look and function like autoclaved aerated concrete and replace concrete, but it is not concrete. It can be embodied as a lightweight, high-performance, ultra-environmentally-friendly nano-composite material, which can be reasonably priced. It can be embodied by itself or with other building components, for example, with open web, light gauge, roll-formed, metal, e.g., galvanized steel, or other studs, to include metal C-studs or those of wood, engineering plastics, composites, and so forth. It can provide excellent fire-resistance, for example, a two- to four-hour fire-resistance rating; provide for sound-dampening and thermal insulation, and have excellent structural strength, especially when used in combination with the open web light gage galvanized steel studs. It can be embodied as or within a core for building construction, an architectural panel, a road repair and restoration mix, and so forth and the like.

Numerous further advantages attend the invention.

THE DRAWING FIGURES

The drawings form part of the present specification. With respect to the drawings, which are not necessarily drawn to scale, the following is briefly noted.

BRIEF KEY TO REFERENCE NUMERALS

Figure 4:
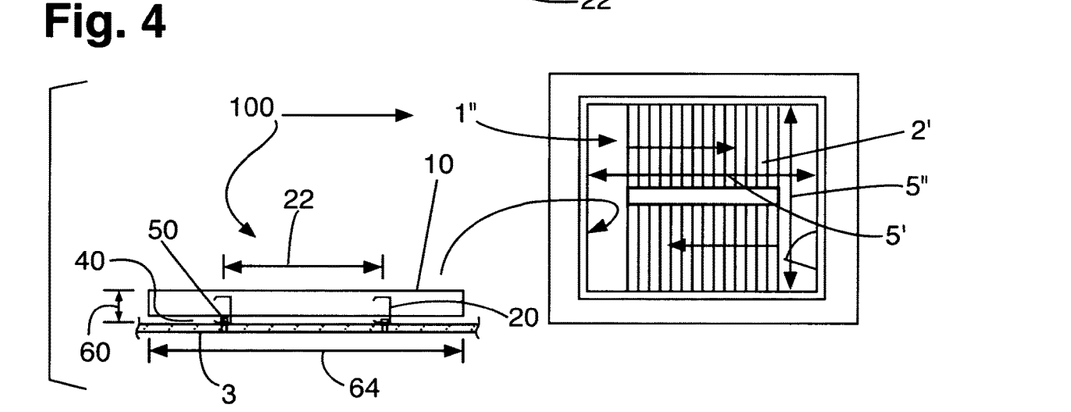
FIG. 4 is a top plan view of a "mineral foam" and open web steel stud stairway/elevator shaft wall assembly of the invention.
Figure 5:
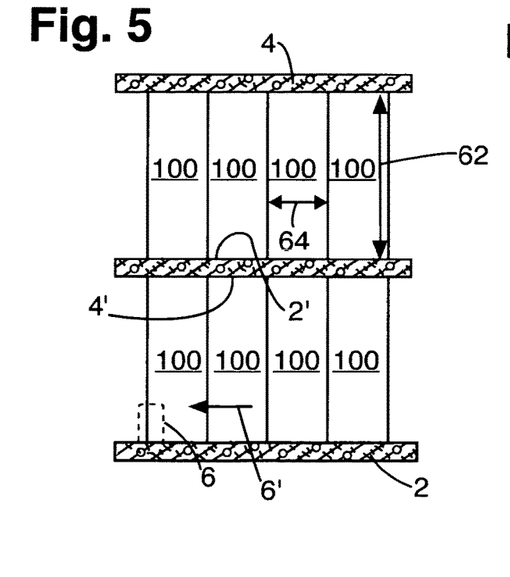
FIG. 5 is a front view of the assembly of FIG. 4.
Figure 6:
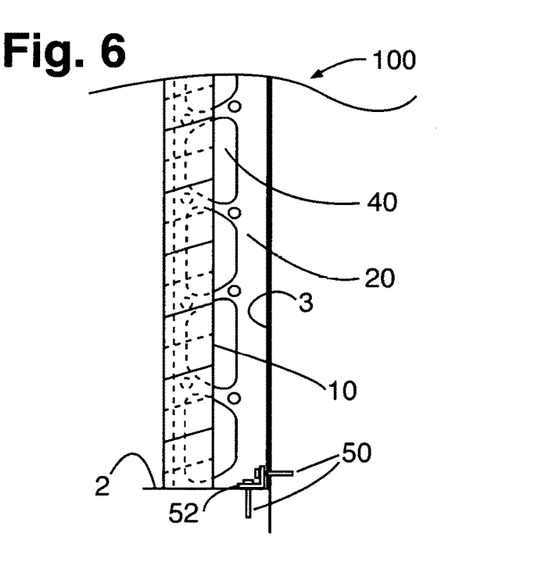
FIG. 6 is a side plan view of detail of the assembly of FIG. 4, taken within geometric form 6 in the direction of arrow 6' in FIG. 5.
Figure 7:
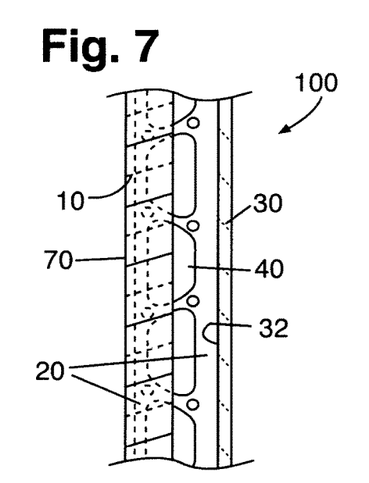
FIG. 7 is a side plan view of a "mineral foam" and open web steel stud curtain wall assembly of the invention.

The following constitutes, in brief, a key to reference numerals found within FIGS. 1-13:
1=first room of a building structure.
1'=second room of the building structure.
1"=third room, e.g., stairwell, of a building structure.
2, 2'=floor of building structure, excluding any panel assembly of the invention.
3=wall of building structure, excluding any panel assembly of the invention.
4, 4'=ceiling of building structure, excluding any panel assembly of the invention.
5, 5', 5"=height, length or width, respectively, of a room of building structure.
6=detailed space for FIG. 6 as displayed by the dashed-line geometrical form in FIG. 5.
6'=arrow indicating direction of view in FIG. 6 as displayed in FIG. 5.
10=lightweight, fire-resistant composition of the invention, cured, e.g., in panel form.
12=thickness of the cured, lightweight, fire-resistant composition of the invention.
12'=a first portion of the thickness 12, e.g., about from one fourth of an inch to one inch, say, about 7/16 of an inch.
12"=a second portion of the thickness 12, e.g., about from one fourth of an inch to one inch, say, about 7/16 of an inch.
20=stud imbedded in the cured, lightweight, fire-resistant composition of the invention.
22=distance between centers of spaced apart, adjacent, imbedded studs.
30=building/room-interior-residing/facing panel of the panel assembly of the invention, e.g., gypsum board (drywall).
32=odor, vapor and/or smoke barrier.
34=utility box, e.g., electrical outlet box.
40=cavity or space to put in wiring, plumbing, insulation, etc.
42=thickness of the cavity or space.
44=foam insulation blown into the cavity or space, e.g., PU foam.
50=fasteners, e.g., screws.
52=brace for use with certain fasteners.
60=thickness of the panel assembly of the invention.
62=length of the panel assembly of the invention, e.g., height when used as a wall.
64=width of the panel assembly of the invention.
70=exterior residing/facing surface or finish of the panel assembly of the invention.
72=exterior-residing/facing panel of the panel assembly of the invention, e.g., external sheathing, say, OSB sheathing.
80=individual connectable panel block, which may be interlocking.
82=length of the panel block 80, e.g., height when used in a wall panel assembly, say, about from one to three feet, to include about two feet.
84=width of the panel block 80, say, about from one to eight feet, to include about four feet.
86=tongue of a panel block 80 as when interlocking, e.g., as a truncated wedge.
86D=dimension of protrusion of the tongue 86, e.g., about from one eighth of an inch to one inch, say, about 3/8 of an inch.
86T=a third portion of the thickness 12, e.g., about from one fourth of an inch to one inch, say, about 9/16 of an inch, taken at the base of the tongue 86.
88=groove of a panel block 80 as when interlocking to receive the tongue 86, e.g., corresponding to the tongue 86.
88D=dimension of depth of the groove 88, e.g., about from one eighth of an inch to one inch, say, about 3/8 of an inch.
88G=a third portion of the thickness 12, e.g., about from one fourth of an inch to one inch, say, about 9/16 of an inch, taken at the superficial limit of the opening of the groove 88.
100=panel assembly of the invention.

Additional Illustrative Embodiments

The invention can be further understood by the additional detail set forth below. As with the foregoing, the following should be taken in an illustrative but not necessarily limiting sense:

The following additional illustrative embodiments are provided hereby:
1) A self-supporting, light-weight wall assembly that provides exceptional fire resistance based on a combination of open web lightweight metal, for example, galvanized steel, studs and a nano-composite "mineral foam" core. Such core can result from mixing a cement mix such as a Phase-5 MOC or Phase-7 MOS cement mix to make a cement with a combination of various metal hydrates with the wet mix cements representing about from 40% to 80% by weight, and the metal hydrates forming about from 20% to 60% by weight, of the total wet mix.

2) A precast light-weight non-combustible wall assembly embracing use of the mineral foam composite mix in the aforementioned patent to Mabey based on a reaction of magnesium oxide and ammonium phosphate, with latex polymers and foaming agent, to form a lightweight foamed composite, along with the open web, roll-formed, lightweight galvanized steel stud. A synergistic effect can result. See, the patent to Mabey. See also, the aforementioned patent to Bodnar, and the aforementioned patent application publication of Bodnar et al.

3) A precast, light-weight, non-combustible wall assembly encompassing use of a mineral foam composite mix—as in the aforementioned patent to Mabey, based on a reaction between magnesium oxide and ammonium phosphate, with latex polymers and foaming agent, to form a lightweight foamed composite—combined with use of a "super hydrate," for example, synthetic Ettringite, to replace the fly ash of the mineral foam of the patent to Mabey to increase the total percent of water of hydration in the composite such that the fire resistance rating of the resulting "mineral foam" composite is increased about from 20% to 50% when tested to ASTM E-119 or ULC CAN4-S101 testing over that of the mineral foam with fly ash of the patent to Mabey.

4) A fire-rated wall assembly such as in additional illustrative embodiment No. 1 that offers notable configuration and design advantages in that the wall is made with service cavities on one side or both sides of a central fire-resistant core, say, for wiring and/or plumbing, without perforating the core. Fire resistance can be compromised when conventional drywall and steel studs are used because the drywall must be cut through to install or gain access to electrical boxes or plumbing fixtures. Such perforations do not compromise the fire resistance of a panel assembly of the present invention. This also improves convenience compared to cement blocks, which do not readily accept wiring or piping within their wall cavities. Compare, FIGS. 1-9.

5) A light-weight, noncombustible, board stock that offers significantly improved fire resistance and insulation when compared to gypsum board. In the case of any of the Sorel Cement mixes, one example of the composite of the present invention with improved fire-resistant performance is prepared by blending 47% magnesium chloride salt with warm water and allowing it to dissolve to form a solution of about from 22 to 28 degrees Baume, adding an approximately 50% by weight of finely ground calcined magnesia, and stirring it under high shear to form a homogenous slurry. To this is added 5% to 10% by weight of a suitable salt stable latex and 15% to 50% by weight of a finely ground "super hydrate" such as Ettringite. In addition, a filler such as saw dust and waste fiber may be added reduce density and to improve fastening with screws, nails and so forth. This mix sets to form a solid composite with a density about from 1.6 to 1.8 g/cc. This mix would be suitable for making a Fire Resistant Composite board stock, which could be manufactured using blending and lay-up equipment commonly used in the manufacture Mag Chloride board imported from China and elsewhere.

6) A light-weight, noncombustible, closed cell "mineral foam" that offers significantly improved fire resistance and insulation when compared to open cell, cellular concrete or even an open cell mineral foam such as that mentioned in the aforementioned patent to Mabey. In the case of any of the Sorel Cement mixes, one example of the composite of the present invention with improved fire-resistant performance is prepared by blending 47% magnesium chloride salt with warm water and allowing it to dissolve to form a solution of about from 22 to 28 degrees Baume, adding an approximately equal weight of finely ground calcined magnesia, and stirring it under high shear to form a homogenous paste. To it is added 5% to 10% by weight of a suitable salt stable latex and 15% to 50% by weight of a finely ground "super hydrate" such as Ettringite. This mix sets to form a solid composite with a density about from 1.6 to 1.8 g/cc. Addition of flax fines, hemp fines or various other agricultural waste, such as rice husks or oat hulls further reduces the density of the finished product down to less than 0.5 g/cc from 1.5 g/cc or higher.

7) A light-weight, closed cell "mineral foam" based on the mix outlined in the additional illustrative embodiment No. 5, in which the closed cell foam structure is formed by combining the ingredients, with an addition of a suitable amount of a latex-enhanced, dry foam including water and, say, about from 3% to 5% by weight of a foaming agent (mixed with 3 parts tap water and 1 part of the same latex polymer), added to a pressure pot and pushed through a foaming gun to produce a light-weight stable foam of about 0.05 g/cc density. This "dry foam" is added to the wet mix of the additional illustrative embodiment No. 5 under low shear to form a uniform, light-weight foamed composite slurry, which, when cured to a solid, is about from 20 to 40 lbs./ft.$^3$.

8) A light-weight wall assembly as in additional illustrative embodiment No. 1, wherein the nano-composite "mineral foam" core based on one of the Sorel cements includes a precisely engineered mix of metal hydrates capable of decomposing to release their water of hydration continuously as the temperature increases, say, about from 100° C. to 900° C. and beyond, say, 1400° C., such that there is a continuous release of water as the composite "mineral foam" is heated under fire conditions, as may be experienced in a building fire or under the test conditions set forth in the ASTM E-119 or ULC CAN4-S101 fire tests. Such a blend may include a dry blend of hydrates, say, 50% "super hydrate," 30% ATH and 20% MGH. Compare, Illustration 4.

9) A "mineral foam" core, as in additional illustrative embodiment No. 3, its metal hydrates having about from one or two to thirty-two molecules of water of hydration per formula unit.

10) A light-weight wall assembly as in additional illustrative embodiment No. 2, which is a fire-rated composite of materials forming a wall or roof assembly that includes an open web, light-weight galvanized steel stud with an overall depth of about from 3.625 to 12.0 inches, for example, as commercially available or manufactured according to the aforementioned patent to Bodnar and/or the aforementioned patent application publication of Bodnar et al.

11) An assembly as in additional illustrative embodiment No. 9, in which the galvanized steel studs are made from about 8-gauge to about 24-gauge galvanized steel.

12) An assembly as in additional illustrative embodiment No. 10, in which the galvanized steel studs are made from about 14-gauge to about 22-gauge galvanized steel.

13) A light-weight wall assembly as in additional illustrative embodiment No. 2, in which the metal hydrates in the composite matrix can provide sufficient fire protection to permit an aerated core with a low density about from 0.45 g/cc to 0.65 g/cc to afford a three- to four-hour fire resistance rating at a 3- to 5-inch overall thickness, when installed as the core in a 4-inch to 12-inch thick wall assembly and tested to ASTM E-119 or ULC CAN4-S101 specifications. For testing, such an assembly may be made of several panels, each, say, about ten feet in height and about from two to six feet wide, to form a 100-ft.² wall. Compare, FIGS. 1-10 and 11-13, noting that configurations may depend on the assembly under test, its intended use, and compliance with applicable building codes.

14) A nano-composite "mineral foam" core, which may be present, for example, as in additional illustrative embodiment No. 2, in which the metal hydrates include at least one of a monohydrate to a dodecahydrate (which may include a dihydrate, a trihydrate to a septahydrate, an octahydrate and/or a decahydrate), plus a more preferred "super hydrate," e.g., synthetic Ettringite. An embodiment may include metal hydrates that are least soluble in water in case the "mineral foam" composite is subjected to water during transit or otherwise. For example, such a blend of hydrates may include about from 1% to 50% by weight ATH and about from 1% to 30% by weight MGH, and about from 25% to 98% by weight of synthetic Ettringite as the portion of dry metal hydrates in the mix as found in additional illustrative embodiment No. 3.

15) A nano-composite "mineral foam" core, which may be present, for example, as in additional illustrative embodiment No. 3, in which metal hydrates include MGH, ATH, MOC, a dodecahydrate such as alum, and Ettringite.

16) A nano-composite "mineral foam" core, which may be present as in additional illustrative embodiment No. 5, in which the metal hydrates provide sufficient fire protection to provide an aerated core with a low density about from 0.45 to 0.60 g/cc with a one- to three-hour fire resistance rating in a wall panel assembly as tested by ASTM E-119 or ULC-CAN4-S101.

17) A nano-composite "mineral foam" core, which may be present as in additional illustrative embodiment No. 5, which is based on a Sorel cement in general or a Portland cement combined with a "super hydrate," e.g., Ettringite, so as to improve a fire resistance rating.

18) A nano-composite "mineral foam" core, which may be present as in additional illustrative embodiment No. 5, in which the compressive strength of the solid composite ranges about from a 20-pound-per-square inch (psi) value up to 800-psi value.

19) A nano-composite "mineral foam" core, which may be present as in additional illustrative embodiment No. 4, in which Sorel cement(s), to include MOC, MOP and/or MOS cement(s), is(are) present, along with a "super hydrate," e.g., Ettringite, which contributes to the water of hydration, for a final value of about from eight to twenty moieties of water of hydration or more per formula unit, and also acts as a binding agent for other powdered or granular metal hydrates.

20) A nano-composite "mineral foam" core, which may be present as in additional illustrative embodiment No. 5, in which the solid core of the wall assembly ranges in density about from a 20-pounds-per-cubic-foot (pcf) value to a 100-pcf value.

21) A nano-composite "mineral foam," which may be present as in additional illustrative embodiment No. 8, in which the compressive strength ranges about from a 20-psi value to a 1,000-psi value, depending on the density and the mix design.

22) A nano-composite "mineral foam," which may be present as in additional illustrative embodiment No. 9, in which compressive strength, bending strength and/or ductility is(are) further enhanced by the addition of natural or man-made fibers added to the wet slurry prior to casting to its final shape. Such fibers may include flax, hemp and/or man-made chopped glass fiber otherwise commonly used in the pre-cast concrete industry.

23) A nano-composite "mineral foam," which may be present as, for example, in additional illustrative embodiment No. 22, in which compressive strength and ductility of the finished composite product is further enhanced with the addition of the natural fibers such as finely chopped flax or hemp fiber to the wet slurry before casting to its final shape. These natural fibers are stronger in tension and bond better to the composite matrix than smooth shafts of the man-made glass fiber strands typical of those used in the precast concrete industry.

24) A nano-composite "mineral foam," which may be present as, for example, in additional illustrative embodiment No. 9, in which the lightweight fire-resistant "mineral foam" core is afforded improved abrasion resistance and reduced friability by the addition of a salt-stable latex such that the polymer is not "shocked" by the presence of chloride or other salts in the wet mix.

25) A nano-composite "mineral foam," which may be present as, for example, in additional illustrative embodiment No. 24, in which the salt-stable latex is selected from the class of acrylic polymers, for example, Nacrylic CP3600 latex from Celanese Emulsions, at about from 3% to 10% of the total weight of the wet composite slurry, or other salt-stable latex polymers.

26) A self-supporting, light-weight wall assembly, present, for example, as in additional illustrative embodiment No. 1, as a composite of materials including an open web light-weight galvanized steel stud with an overall depth of about from 3.625 to 12.0 inches, commercially available from SteelForm Incorporated of Edmonton, Alberta, Canada and/or as described in the aforementioned patent to Bodnar and/or published patent application of Bodnar et al.

27) A nano-composite "mineral foam," which may be present, for example, as in additional illustrative embodiment No. 10, wherein abrasion resistance, flexural strength and insulation properties of the composite foam are enhanced by adding about from 1% to 15% by weight of a salt-stable latex polymer, for example, CP3600 polymer available from Celanese Canada Inc.

28) A mixture containing metal hydrates for a "mineral foam" in which a wet slurry of Sorel or other cementitious materials is aerated by a light-weight aqueous foam made by forcing a mixture of water with about from 1% to 5% by weight of a foaming agent (or surfactant) such as CF700 product from Unifoam Company Limited of Scarborough, Ontario, Canada, through a foaming gun to form a cellular foam having a consistency of canned shaving cream and having a density of about 0.075 g/cc, which is stirred into the slurry to increase its volume and reduce its density before it is cast to form a part, form a slab, or fill a cavity.

29) An aerated wet slurry as, for example, in additional illustrative embodiment No. 28 that includes ingredients commonly known in the art to form a Phase 5 MOC cement, or other Sorel cement(s), combined with the addition of the metal hydrates as functional fillers to form a metal hydrate slurry, in which the metal hydrate slurry is thickened up with a gelatinous blend of water, say, about from ninety-three to ninety-seven parts by weight and about from 3% to 7% by weight dry powdered Xanthan gum, a hydrocolloid biopolymer, for example, Kelzan and/or Kelzan S product(s) from Kelco Corporation, Atlanta, Ga., U.S.A. This viscose liquid serves to thicken up the foamed wet matrix and trap the air formed as the foam so that the foamed slurry does not collapse before the cement matrix has stiffened up enough to support its own weight before curing it to a light-weight, solid matrix having a density about from 20 to 60 pcf.

30) An aerated wet slurry as in additional illustrative embodiment No. 28, which is made from a mixture of common city tap water, and a 3% to 5% concentration of foaming agent, for example, CF70 foaming agent, and pushed through a foaming gun, which is then added to the wet slurry to form a self-supporting foamed slurry that traps air in very fine bubbles and retains volume without significant loss of volume of a MOC, MOS or MOP cement mix while the reaction moves to completion forming a solid open cell or closed cell composite matrix having a dry density about from 17.5 to 40 pcf.

31) An aerated wet slurry, which sets to form a solid for example, otherwise as in additional illustrative embodiment No. 28, in which the aqueous foam is replaced in whole or in part by light-weight, hollow glass spheres. These may be recycled post-consumer hollow glass spheres such as those formed by recycling post-consumer glass waste in a proprietary process known as Poravor technology available from Poravor North America of Innisfil, Ontario, Canada, which results in production of nano-porous, expanded glass aggregate (spheres) in sizes about from 0.25 mm to 0.50 mm, about from 0.50 mm to 1.0 mm, about from 1.0 mm to 2.0 mm, about from 2.0 mm to 4.0 mm, and about from 4.0 mm to 8.0 mm. Such spheres feature low density and high grain compressive strength; they are hydrophobic, thus not absorbing or otherwise retaining water, and are much more crush resistant than foam plastic spheres such as expanded polystyrene (EPS) known in the prior art. This means that such hollow glass spheres maintain their volume and density during mixing. They can be added to the metal hydrate slurry to bulk it up to, say, an about 20-pcf to 60-pcf value, which can result in a closed-cell foam that provides improved insulation and lower air permeability than an open cell foam that results from excluding the latex altogether, or when using the latex in the slurry only to make the light weight cellular composite but not in the foam generating stage.

32) A lightweight, aerated composite such as otherwise found within additional illustrative embodiment No. 28, in which a mixture of $MgCl_2$, or $MgSO_4$ with MgO and water for forming a magnesium-based cement, based on MOS, MOC or MOP binders, plus metal hydrate(s), which can include a "super hydrate," is thickened using a mixture of about from 3% to 5% by weight of a xanthan gum solution (at about 2 to 4% in water), preferably Kelzan from Kelco Corporation of Atlanta, Ga., U.S.A., or equivalent, added to the MOC, MOS, or MOP slurry to build viscosity and ensure that the aerated composite blend maintains its volume until such time as the chemical reaction is sufficiently complete to form a self supporting solid matrix. The use of a gelatinous foam is beneficially employed in the present invention over a use of "reactive materials" such as metal oxides, hydroxides, sulfides and so forth to produce gas to foam the slurry, as disclosed in the aforementioned patent to Mabey, because these "reactive materials" can produce gas at various rates, depending on pH, temperature, and other variables, which can affect the final volume and density of the foam, which thus can vary from one batch to another. An advantage of using a pre-expanded foam is that the volume of the final product can be established and adjusted immediately, and then remain constant until the composition has set. "Reactive materials," in addition, may not be chemically compatible with latex polymers employed in the present invention, whereas xanthan gum, foaming agent, water and latex polymer, as indicated above, is reliable, predictable and constant over a wide range of temperatures.

33) A structural or in fill wall panel, which may be present as in additional illustrative embodiment No. 1, wherein the open web metal studs are spaced at about eight, twelve, sixteen or twenty-four inches from one another, for example, oriented vertically for a wall panel.

34) Inclusion of latex polymer right into a foam generator by mixing the latex polymer with water at a polymer to water ratio about from 1:1 to 1:10, with an addition of about from 1% to 5% of a suitable foaming agent, for example, CF700 foaming agent from Unifoam Corporation of Mississauga, Ontario, Canada, when making foams with such a contrivance so that the foam is essentially made up of latex polymer, water and the foaming agent. Typically, a closed cell foam results since, in general, each tiny bubble within the "mineral foam" composite, which results from the gas, for example, air, is lined with the latex polymer, which can drastically reduce air permeability of the cellular structure of the composite. This increases the R-value of the "mineral foam" because a closed cell foam has much higher thermal resistance than an open cell foam structure. Two otherwise identical mixes, one with and the other without latex in the foam portion of the mix, can be tested for measurement of the passage of air through each composite mineral foam sample taken as 1-inch slabs dried to a 22-pcf value. When subject to a 5-psi air pressure, the closed cell foam blocks passage of air more than 70% over the open cell version of the otherwise same mix but without the latex polymer in the foam.

The following examples further illustrate the invention.

EXAMPLE 1

A precast wall panel is made with a mineral foam composite containing fly ash, as of the aforementioned patent to Mabey, and open web, light gage, thermally efficient, galvanized steel studs. The functionality of the mineral foam composite is greatly enhanced by forming the panels with the open web steel studs, as compared to steel C-studs with solid webs that have a higher thermal transfer from one face to the other (from outside to inside or vice versa). The wall assembly measures from six to twenty feet high, four to ten feet in width, and 3⅝ to eight or to ten inches thick, or any other dimension that can be assembled and be handled with manpower or mechanical lifting equipment without being damaged in the process.

EXAMPLE 2

A precast wall panel otherwise as in Example 1 is made with a "mineral foam" composite and open web, light gage, thermally efficient, galvanized steel studs. The "mineral foam" composite is a mineral foam composite otherwise as in the patent to Mabey but substituting synthetic Ettringite for the fly ash. Fire resistance of the "mineral foam" composite, and thus the panel, is greatly enhanced by employing the Ettringite.

EXAMPLE 3

Figure 8:
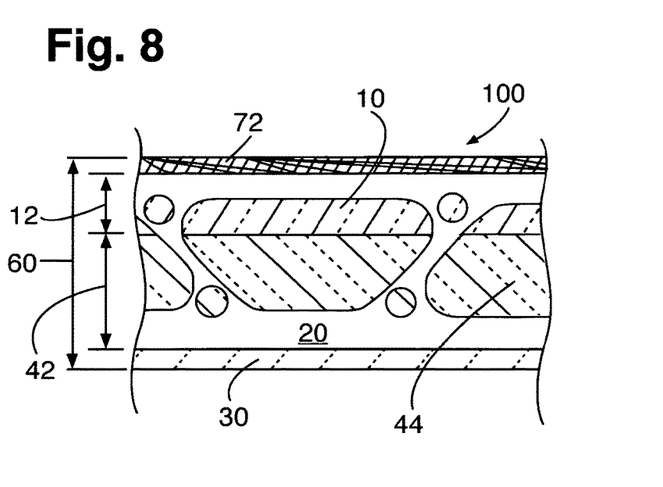
FIG. 8 is a side view, in section, of a hybrid, two-hour fire-rated R-30 precast "mineral foam" and open web steel stud panel assembly of the invention. OSB sheathing, e.g., ⅜-inch thick, for ease of exterior finishing, adjacent a 2-inch thick fire-rated composite "mineral foam" panel of the invention, plus four inches of closed cell polyurethane (PU) foam, rated R-28, is finished inside with ⅝-inch Type X, 20-minute fire-rated drywall. Dependable, long-lasting fire resistance is thus provided versus that found when insulation such as rock wool or glass fiber and so forth is used and settles over time, adding an extra measure of safety and a confirmed, high insulation rating because the PU foam sticks to all the inside surfaces and does not suffer compression sag, or settle over time.
Figure 9:
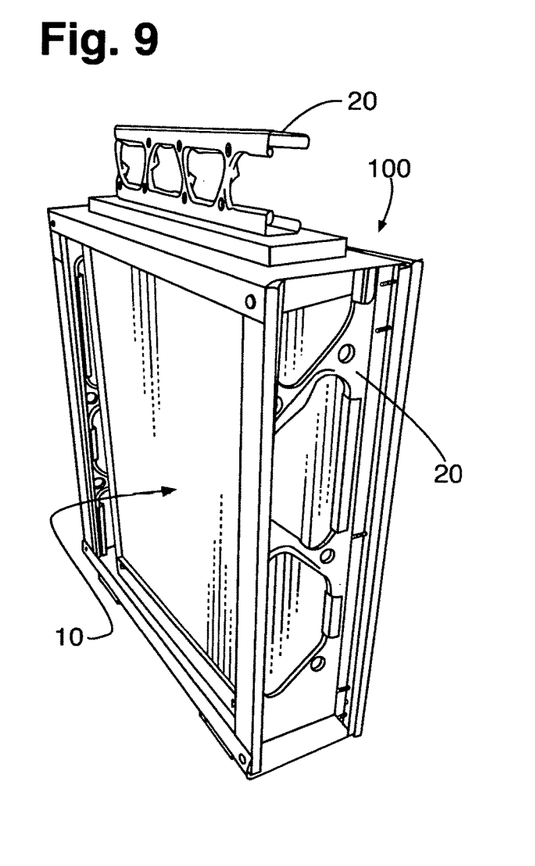
FIG. 9 is a perspective view of an embodiment as for display of a structure as of FIG. 8 but leaving a service cavity in the wall, which permits installation of utilities such as plumbing and/or electrical, without compromising the fire-resistance rating from perforating drywall. The "mineral foam" core provides the fire resistance rating, with the drywall having little effect since, if the drywall is perforated for utilities, the integrity of fire resistant composite core remains intact. Plus, the open web light gage steel studs with their open webs offer excellent adjunct performance in reducing heat transfer across the assembly while providing stiffness, strength, and connectivity. A bare stud and board thereunder are also displayed on top of the structure.
Figure 10:
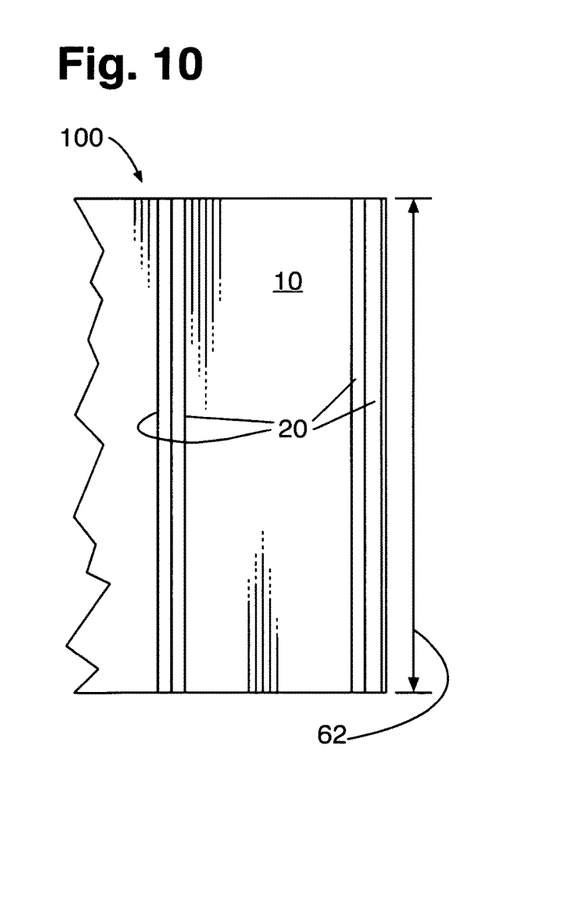
FIG. 10 is a rear elevational view of another "mineral foam" and stud wall section assembly embodiment of the invention. This embodiment includes multiple, side-by-side studs embedded closely adjacent one another in the core for increased load-bearing capacity.

A wall panel as of FIG. 8 is made with the "mineral foam" composite and open web, light gage, thermally efficient, galvanized steel studs of Example 2 and a PU foam. This forms a composite wall panel assembly with properties that include an R-30 insulation rating; a 2-hour fire resistance rating; adequate sheer and load bearing properties, based for the most part on the size and gage of the steel in the open web steel studs, which can be selected from the engineered load tables provided by the manufacturer of the studs to meet the structural requirements of the building at hand. The wall panel assembly includes exterior sheathing of ⅜-inch thick OSB or Type X exterior grade drywall, or other suitable sheathing, say, as required by local building and fire codes. Studs are fastened together using fabrication methods known to the construction industry, and the exterior sheathing is fastened thereto with fasteners such as screws and/or adhesives. The stud-and-sheathing subassembly is laid in a horizontal orientation to form a "pan," with the exterior sheathing at the bottom, into which sufficient slurry to form a "mineral foam" core such as in Example 2 to a depth of two or more inches is cast and allowed to set and dry. Once set and dry to constant mass, a PU mix to form a PU foam is applied, primarily to the "mineral foam" surface by spraying, ladling, or other practice, to include other standard industry practice for mixing and applying such products, and allowed to rise freely and level off. Excess foam, which expands beyond the upper most surface of the steel studs is shaved off and discarded, leaving a smooth, level surface. Next, Type X fire-rated drywall is installed on the interior side by use of fasteners such as screws and/or by adhesive, which acts as a thermal barrier to protect the PU foam as required by most, if not all North American Building codes where foamed plastic such as PU would be exposed to the occupied space of a commercial or residential building, where the wall panel is employed in the building.

EXAMPLE 4

A wall panel as of Example 3 is made except that application of the PU foam is omitted and the thickness of the "mineral foam" is increased to provide greater fire resistance, say, as a replacement for concrete block, so as to offer two to four hours of fire resistance. Use of a wall panel of the invention such as this reduces the overall weight of the wall section by as much as two-thirds. It also improves efficiencies at the building site dramatically since the precast wall panel assembly can be manufactured off-site in a controlled environment and thus eliminate needs and costs associated with scaffolding, and heating and hoarding as in colder climes, particularly when temperatures fall below 5° C. (about 40° F.), the lowest temperature typically permitted for installation of concrete blocks without the added protection provided by heating and hoarding at the construction site.

EXAMPLE 5

The wall panel of Example 4 is employed in situations where difficulties in installing utilities such as electrical wiring and/or plumbing would be present within a concrete block wall. By eliminating the PU foam in the wall panel assembly a service cavity within the wall panel is provided. This wall panel also eliminates any need to install drywall as a fire-rated membrane and also mitigates challenges associated with maintaining a fire-resistance rating when utilities are installed as in typical, multi-layered drywall assemblies since perforation of the drywall affects the fire-resistance rating of the wall assembly as heat during a fire inevitably finds its way into the wall cavity through the perforation to engender its undesired effects there.

EXAMPLE 6

Wall panels as in FIGS. 1-10 are made with "mineral foam" open cell composite cores made with a MOP, MOC or MOS cement mix, and synthetic Ettringite of Illustration 1. The light-weight, substantially foamed, synthetic Ettringite "super hydrate" can be readily crushed to form a light weight aggregate for use in any number of cementitious matrices to improve the fire resistance of these materials whether as a solid mass, a foamed concrete, or a composite blend.

EXAMPLE 7

Panel assemblies as in FIGS. 1-10 are made in which the "mineral foam" core includes an open cell foam structure with MOC cement and a "super-hydrate." The MOC cement slurry mix has a molar ratio of roughly 1.5:12.5, and includes a blend, with parts and/or percentage by weight unless otherwise indicated, as follows:

500 to 700 parts of $MgCl_2$ and 200 to 350 parts warm water are premixed to form a clear, syrupy liquid about from 22 to 28 degrees Baume. To that liquid is added the following:

550 to 750 parts light-burned MgO with high surface reactivity such a B-40 product from Baymag Inc., Exshaw, Alberta, Canada;

10 to 30 parts of an iron oxide pigment;

150 to 250 parts CP3600 salt-stable latex polymer from Celanese Company;

350 to 700 parts Ettringite, made according to Illustration 1;

2 to 20 parts of a suitable foaming agent—such as CF-70 from Inifoam Company, Scarborough, Ontario, Canada, or any one of many others available in the concrete industry;

15 to 30 parts finely chopped flax or hemp fines—small strands about from 1/16 of an inch to 2 inches in length, which are generally derived from the waste stream at a flax or hemp fiber processing facility; and 50 to 300 pts of a 3% to 5% aqueous solution of Kelsan biopolymer thickener from Kelco U.S.A.

All ingredients are mixed using a high shear mixer to form a consistent, viscous slurry having a wet density of approximately 130 to 160 g/cc. Added next is a "dry foam" mix of 3% to 5% concentration of CF70 foaming agent from Unifoam, Scarborough, Ontario, Canada, blended with water and discharged through a commercial foam generator common to the concrete industry. The "dry foam" mix has a density of about 0.075 kg/L. Addition by gentle, low-sheer, folding action, of about 50% to 75% by volume of "dry foam" to 25 to 50% by volume of wet slurry produces a stable, foamed slurry with a wet density about from 100 to 160 pcf before it is formed, set and dried to provide a "mineral foam" core of about from 20 to 40 pcf dry density.

EXAMPLE 8

Panel assemblies as in FIGS. 1-10 are made in which the "mineral foam" core includes a closed cell foam structure with MOC cement and a "super-hydrate." The MOC cement slurry mix has a molar ratio of roughly 1.5:12.5, and includes a blend, with parts and/or percentage by weight unless otherwise indicated, as follows:

550 to 700 parts of $MgCl_2$ and 200 to 350 parts warm water are premixed to form a clear, syrupy liquid about from 22 to 28 degrees Baume. To that liquid is added the following:
- 550 to 750 parts light-burned MgO with high surface reactivity such a B-40 product from Baymag Inc., Exshaw, Alberta, Canada;
- 10 to 30 parts of an iron oxide pigment;
- 150 to 250 parts CP3600 salt-stable latex polymer from Celanese Company;
- 350 to 700 parts Ettringite, made according to Illustration 1;
- 2 to 20 parts of a suitable foaming agent—such as CF-70 from Inifoam Company, Scarborough, Ontario, Canada, or any one of many others available in the concrete industry;
- 15 to 30 parts finely chopped flax or hemp fines—small strands about from 1/16 of an inch to 2 inches in length, which are generally derived from the waste stream at a flax or hemp fiber processing facility; and
- 50 to 300 pts of a 3% to 5% solution of Kelsan biopolymer thickener by Kelco.

All ingredients are mixed using a high shear mixer to form a consistent, viscous slurry having a wet density of approximately 130 to 160 g/cc. Added next is a "dry foam" mix of 3% to 5% concentration of CF70 foaming agent from Unifoam, Scarborough, Ontario, Canada, blended with 35% to 60% water and 35% to 60% latex polymer such as the CP3600 salt-stable latex polymer (so as to form 100% by weight of blended "dry foam" mix), which is discharged through a commercial "foam generator" common to the concrete industry. The resulting composite "mineral foam" is a closed cell foam with a fine film of latex polymer coating the microscopic voids in the MOC cement matrix, which provides good insulation and minimal air permeability, depending on the final dry density of the cured "mineral foam," which may be about from 19 to 42 pcf.

EXAMPLE 9

Panel assemblies as in FIGS. 1-10 are made in which the "mineral foam" core includes an open cell foam structure with MOS cement and a "super-hydrate." The MOS cement slurry, being made as an 11:1:20 MgO:MOS:water mix, includes a blend, with parts and/or percentages by weight unless otherwise indicated, as follows:
- 240 to 300 parts of $MgSO_4$-$7H_2O$ and 225 to 280 parts warm water are premixed to form a clear, syrupy liquid. To that liquid is added the following:
- 250 to 300 parts light-burned MgO with high surface reactivity such a B-40 product from Baymag Inc., Exshaw, Alberta, Canada;
- 5 to 100 parts of an iron oxide pigment;
- 12 to 20 parts CP3600 salt-stable latex polymer from Celanese Company;
- 150 to 300 parts Ettringite, made according to Illustration 1;
- 2 to 10 parts of a suitable foaming agent—such as CF-70 from Inifoam Company, Scarborough, Ontario, Canada, or any one of many others available in the concrete industry;
- 5 to 25 parts finely chopped flax or hemp fines—small strands about from 1/16 of an inch to 2 inches in length, which are generally derived from the waste stream at a flax or hemp fiber processing facility; and
- 5 to 100 pts of a 3% to 5% solution of Kelsan biopolymer thickener from Kelco U.S.A.

All ingredients are mixed using a high shear mixer to form a consistent, viscous slurry having a wet density of approximately 130 to 160 g/cc. Added next is a stiff "dry foam" mix of 3% to 5% concentration of CF70 foaming agent from Unifoam, Scarborough, Ontario, Canada, blended with 95% to 97% water and discharged through a commercial "foam generator" common to the concrete industry. The resulting composite "mineral foam" is an open cell foam, which provides reasonable insulation and moderate air permeability, depending on the final dry density of the cured "mineral foam," which may be about from 19 to 42 pcf.

EXAMPLE 10

Panel assemblies as in FIGS. 1-10 are made in which the "mineral foam" core includes an open cell foam structure with MOS cement and a "super-hydrate." The MOS cement slurry, being made as an 11:1:20 MgO:MOS:water mix, includes a blend, with parts and percentage by weight unless otherwise indicated, as follows:
- 120 to 300 parts of $MgSO_4$-$7H_2O$ and 225 to 280 parts warm water are premixed to form a clear, syrupy liquid. To that liquid is added the following:
- 250 to 300 parts light-burned MgO with high surface reactivity such a B-40 product from Baymag Inc., Exshaw, Alberta, Canada;
- 5 to 10 parts of an iron oxide pigment;
- 12 to 20 parts CP3600 salt-stable latex polymer from Celanese Company;
- 150 to 300 parts Ettringite, made according to Illustration 1;
- 2 to 20 parts of a suitable foaming agent—such as CF-70 from Inifoam Company, Scarborough, Ontario, Canada, or any one of many others available in the concrete industry;
- 15 to 100 parts finely chopped flax or hemp fines—small strands about from 1/16 of an inch to 2 inches in length, which are generally derived from the waste stream at a flax or hemp fiber processing facility; and
- 50 to 200 pts of a 3% to 5% solution of Kelsan biopolymer thickener from Kelco U.S.A.

All ingredients are mixed using a high shear mixer to form a consistent, viscous slurry having a wet density of approximately 130 to 160 g/cc. Added next is a stiff "dry foam" mix of 3% to 5% concentration of CF70 foaming agent from Unifoam, Scarborough, Ontario, Canada, blended with 95% to 97% water and discharged through a commercial "foam generator" common to the concrete industry. The resulting composite "mineral foam" is an open cell foam, which provides reasonable insulation and moderate air permeability, depending on the final dry density of the cured "mineral foam," which may be about from 19 to 42 pcf.

EXAMPLE 11

Panel assemblies as in FIGS. 1-10 are made in which the "mineral foam" core includes a closed cell foam structure with MOS cement and a "super-hydrate." The MOS cement slurry, being made as an 11:1:28 MgO:MOS:water mix, includes a blend, with parts and percentage by weight unless otherwise indicated, as follows:
- 125 to 175 parts of $MgSO_4$-$7H_2O$ and 225 to 250 parts warm water are premixed to form a clear, syrupy liquid. To that liquid is added the following:
- 250 to 300 parts light-burned MgO with high surface reactivity such a B-40 product from Baymag Inc., Exshaw, Alberta, Canada;

5 to 10 parts of an iron oxide pigment;

25 to 35 parts CP3600 salt-stable latex polymer from Celanese Company;

150 to 300 parts Ettringite, made according to Illustration 1;

2 to 20 parts of a suitable foaming agent—such as CF-70 from Inifoam Company, Scarborough, Ontario, Canada, or any one of many others available in the concrete industry;

15 to 100 parts finely chopped flax or hemp fines—small strands about from 1/16 of an inch to 2 inches in length, which are generally derived from the waste stream at a flax or hemp fiber processing facility; and 50 to 100 pts of a 3% to 5% solution of Kelsan biopolymer thickener from Kelco U.S.A.

All ingredients are mixed using a high shear mixer to form a consistent, viscous slurry having a wet density of approximately 130 to 160 g/cc. Added next is a "dry foam" mix of 3% to 5% concentration of CF70 foaming agent from Unifoam, Scarborough, Ontario, Canada, blended with 35% to 60% water and 35% to 60% latex polymer such as the CP3600 salt-stable latex polymer (so as to form 100% by weight of blended "dry foam" mix), which is discharged through a commercial "foam generator" common to the concrete industry. The resulting composite "mineral foam" is a closed cell foam with a fine film of latex polymer coating the microscopic voids in the MO cement matrix, which provides good insulation and minimal air permeability, depending on the final dry density of the cured "mineral foam," which may be about from 19 to 42 pcf.

EXAMPLE 12

Panel assemblies as in FIGS. 1-10 are made in which the "mineral foam" core includes a closed cell foam structure with MOS cement and a "super-hydrate." The MOS cement slurry, being made as an 11:1:20 MgO:MOS:water mix, includes a blend, with parts and percentage by weight unless otherwise indicated, as follows:

125 to 175 parts of $MgSO_4\text{-}7H_2O$ and 200 to 220 parts warm water are premixed to form a clear, syrupy liquid. To that liquid is added the following:

250 to 300 parts light-burned MgO with high surface reactivity such a B-40 product from Baymag Inc., Exshaw, Alberta, Canada;

5 to 10 parts of an iron oxide pigment;

25 to 35 parts CP3600 salt-stable latex polymer from Celanese Company;

150 to 300 parts Ettringite, made according to Illustration 1;

2 to 20 parts of a suitable foaming agent—such as CF-70 from Inifoam Company, Scarborough, Ontario, Canada, or any one of many others available in the concrete industry;

15 to 100 parts finely chopped flax or hemp fines—small strands about from 1/16 of an inch to 2 inches in length, which are generally derived from the waste stream at a flax or hemp fiber processing facility; and 50 to 100 pts of a 3% to 5% solution of Kelsan biopolymer thickener from Kelco U.S.A.

All ingredients are mixed using a high shear mixer to form a consistent, viscous slurry having a wet density of approximately 130 to 160 g/cc. Added next is a "dry foam" mix of 3% to 5% concentration of CF70 foaming agent from Unifoam, Scarborough, Ontario, Canada, blended with 35% to 60% water and 35% to 60% latex polymer such as the CP3600 salt-stable latex polymer (so as to form 100% by weight of blended "dry foam" mix), which is discharged through a commercial "foam generator" common to the concrete industry. The resulting composite "mineral foam" is a closed cell foam with a fine film of latex polymer coating the microscopic voids in the MOS cement matrix, which provides good insulation and minimal air permeability, depending on the final dry density of the cured "mineral foam," which may be about from 19 to 42 pcf.

EXAMPLE 13

Figure 11:
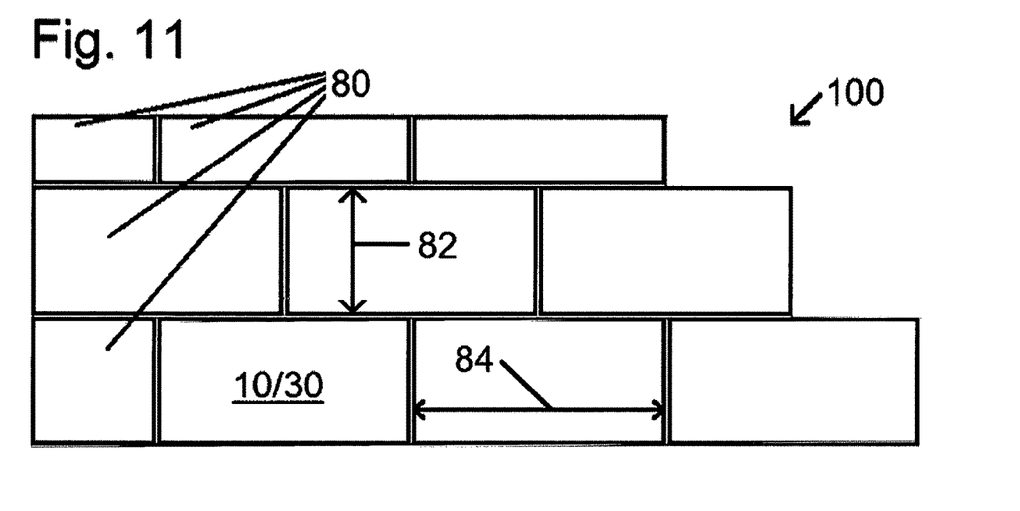
FIG. 11 is a side elevational view of a sample illustration of an assembled "mineral foam" composite flat panel, for example, about from one to two inches, say, about 1½ inches, in thickness, manufactured for on-site assembly as individual connectible panel blocks, which may interlock with one another through a tongue and groove provision. Panels of this illustration can be made with a textured, interior or exterior facing material to upgrade the fire resistance rating of an existing wall, ceiling, or assembly, for example, by forty-five to ninety minutes depending on their thickness; and they can be installed over an existing substrate using a cementicious tile grout or other appropriate adhesive. Such panels can provide a cost-effective means of increasing the "fire separation" between occupancies, reducing sound transmission between living spaces, and providing a novel decorative finish, all in a single installation.
Figure 12:
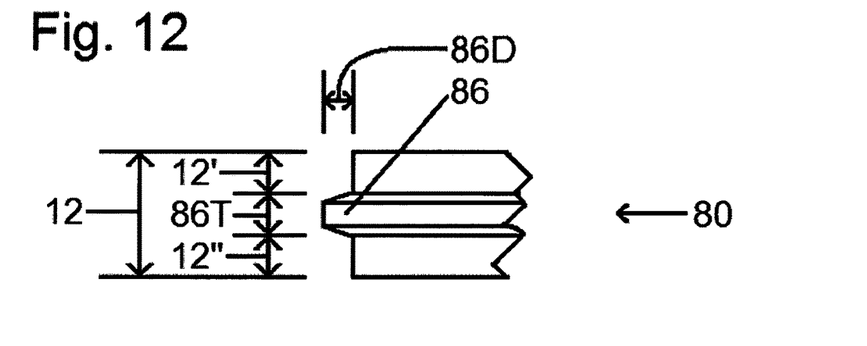
FIG. 12 is a view of a tongue provision in an individual panel block in FIG. 11.
Figure 13:
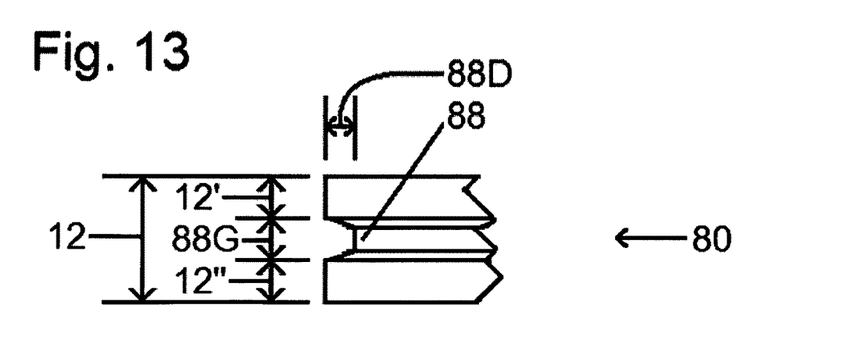
FIG. 13 is a view of a groove provision in an individual panel block in FIG. 11, into which a corresponding tongue provision such as depicted in FIG. 12 can be received.

Individual connectable "mineral foam" panel blocks, which may interlock with one another through a tongue and groove provision, for on-site assembly as a composite flat panel, as in FIGS. 11-13, are made according to the methods for making the "mineral foam" cores as in FIGS. 6-12. Properties of the resulting "mineral foam" panel blocks correspond thereto.

The individual connectable panel blocks may be without a tongue and groove or other mortise and tenon type connection, and be connectable by butting edges of the panel blocks against one another as in side to side and top to bottom abutments to make simple butt joints so as to form a composite flat panel. Corners may be made employing corresponding butting joints. In such arrangements, however, as convenient as it may be to form, in some cases a certain weakness or even a slight gap going directly between rear and front sides with respect to the butted edges may make it somewhat easier for a fire to break through more rapidly than with a tongue and groove connection.

However that may be, the individual connectable panel blocks include the tongue and groove or other mortise and tenon type connection such that they may readily interlock with one another for on-site assembly as a composite flat panel. The tongue and groove provisions may be provided on any suitable portion of each panel block. For instance, in panel blocks having quadilaterally shaped faces, which would include rectangularly or squarely faced panel blocks, tongue provisions may be generally provided on first, say, right side, and second, say, top, edges, and corresponding groove provisions may be generally provided on opposing third, say, left side, and fourth, say, bottom edges. Certain panel blocks may be provided with groove and/or tongue provisions in their faces, say, near vertically and/or horizontally oriented edges, so as to be able to mate with corresponding tongue and/or groove provisions on edges of other panel blocks in order to provide for a tongue and groove interlock in corner joints. In such arrangements, which are typically convenient to form, the tongue and groove provisions can help gain consistent coverage and protection without the weakness or gap going directly between rear and front sides as may be found with butt joints. Thus, fire protection can be more surely provided.

The individual connectable "mineral foam" panel blocks are typically easy to saw through. Thus, they can be cut to adapt to fit in many installations. And so, if a tongue provision would be in the way or a groove provision not needed, say, in forming a terminus of a wall, these provisions may be cut away from the rest of a set of panel blocks.

Also, panel blocks may have cementitious or other material added such as by cementing with a "mineral foam" slurry, a grout, and so forth, and allowed to cure. Thus, for example, a tongue provision may be augmented or groove provision may be filled as needed or desired.

EPILOGUE

Figure 1:
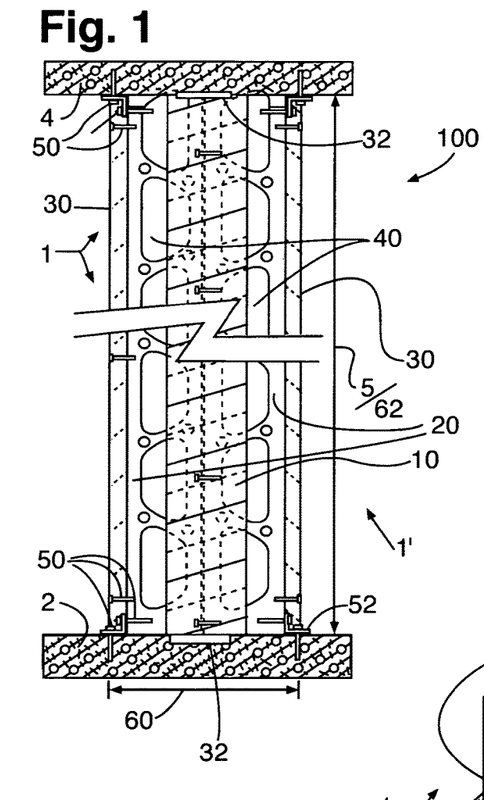
FIG. 1 is a side plan view of a "mineral foam" and open web steel stud acoustic and fire-separation party wall assembly of the invention.
Figure 2:
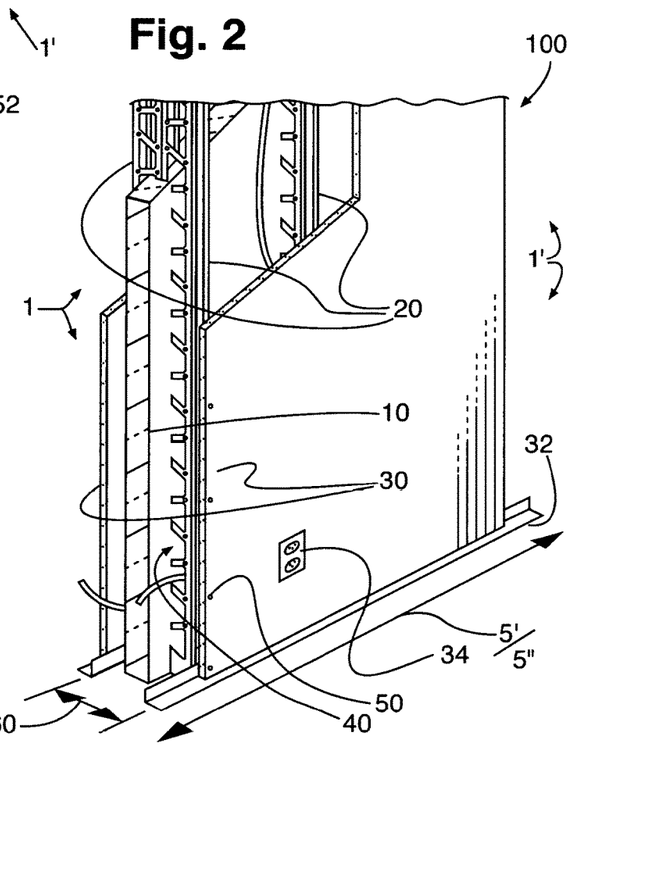
FIG. 2 is a perspective view, in partial section, of the assembly as of FIG. 1.
Figure 3:
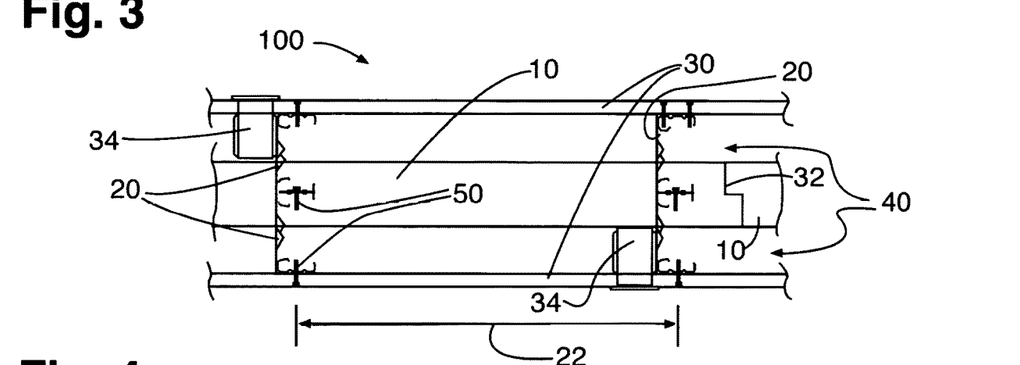
FIG. 3 is a top plan view of the assembly of FIG. 1.

As depicted in FIGS. 1-3, a panel assembly may be provided, for example, as a symmetrical panel assembly that may be employed itself as a wall or employed against another wall. Asymmetric panels can be provided as well, for example, as depicted in FIGS. 4-6 as a stairwell/elevator shaft wall panel assembly, in FIG. 8 as a curtain wall panel assembly, and in FIG. 10 as a wall panel assembly with closely adjacent studs to provide added load bearing capability. A panel specimen such as in FIG. 9 may embody structure and principles of the invention for exhibit, sales, and study purposes.

Such panels may include a "mineral foam" core. A "super hydrate" may be employed.

The panel assemblies can have acoustic and fire-separation properties, thus being capable of deadening sound and providing a fire-resistant barrier. An odor- and/or vapor-resistant strip, caulking or barrier may be provided, for example, on top, bottom and side edges. The panel assemblies can have very lightweight, high strength, and be structurally employed. Such panel assemblies generally are noncombustible and have two-hour fire-resistance ratings or higher, depending on the thickness and density of the core and the choice of skins employed. OSB, for example, will do little to improve on the fire rating, and Type X Fire rated gypsum may add an extra twenty or thirty minutes to the rating of the assembly. With a fire-resistant core, for example, of a mineral foam of other art or a "mineral foam" of the present invention—into which is embedded a series of studs—utilities such as electrical or communication wiring, plumbing and so forth can be installed in a cavity that may be provided by studs that leave a portion not embedded in the core on one or both sides of the core, without compromising the fire-resistance of the panel assembly provided through its core panel. Extra insulation can be provided in the cavity in lieu of or after installation of utilities such as, for example, by spraying PU foam into the cavity on site after installation of a panel assembly and its utilities.

The panels can be ecologically friendly, and employ synthetic fibers such as glass fibers and/or natural fibers or hulls such as of hemp or flax and waste of rice or oats. The same can provide for additional strength.

Interior and/or exterior sheathing and/or surfaces can be provided to a panel assembly in advance. For example, interior sheathing can be provided by gypsum board; exterior sheathing can be provided by OSB sheathing; and interior and/or exterior surfaces can be coated with such materials as plaster, stucco, conventional paint and/or fire-retardant paint. Architectural detail may be provided for with interior and/or exterior sheathing and/or other suitable surfaces.

The present panel assemblies are efficiently made and reasonably priced.

The panel assemblies can be provided to a job site as light-weight, pre-cast wall, ceiling and/or floor components, ready to install, for example, with tilt-into-place wall emplacement. They are easy to ship and easy to handle by two people. No crane or other lifting equipment may be required, depending, of course, depending on the final size of the panels, on the site at hand and the desires of the construction crew. The panel assemblies reduce job-site labor time and cost; can be installed quickly, and in any season; can be installed in virtually any building, commercial, residential, institutional, or industrial; save on materials and waste; and permit ease and flexibility of design.

The present panel assemblies can be employed not only as or against a wall, but also as or against a ceiling or floor, as design or structure permits. Many other uses of the panel assemblies can be envisioned by those skilled in, to include those of ordinary skill in, the art.

Also, as depicted in FIGS. 11-13 an individual connectable panel block may be provided, which may interlock with a corresponding connectible panel block through a tongue and groove provision, for on-site assembly as a composite flat panel. Such blocks may be made of or with a "mineral foam," with a "super hydrate" optionally employed, and be in a form of a tile.

In situation where a retro-fit or "change or use" to an existing occupancy mandates an increase or improvement to an existing wall or ceiling, the mineral foam composite of the invention may be cast in molds to be used as functional (and decorative) surfaces on the interior or exterior of the structure. The decor panels can be cast using a decorative surface as the lower upward-facing surface (bottom of the panel) with a three-dimensional face made from flexible rubber or silicone materials, imitating stone veneers, brickwork, rough sawn lumber and so forth. These panels serve to meet updated fire codes (based on the requirements under the change of use) and assist in dampening sound transmission from one occupancy to the adjacent one.

INCORPORATIONS BY REFERENCE

The specification of the aforementioned priority application, U.S. provisional patent application No. 62/601,911, to include its drawings, is incorporated herein by reference in its entirety. As well, each of the aforementioned patents, published patent applications, and journal references, to include their drawings, is incorporated herein by reference in its entirety.

CONCLUSION TO THE INVENTION

The present invention is thus provided. Various feature(s), part(s), step(s), subcombination(s) and/or combination(s) can be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. An article of manufacture comprising a cured solid, light-weight, fire-resistant mineral-foam, which includes an inorganic cementitious matrix and at least one metal hydrate that is a super hydrate substance, in which water is present with the super hydrate substance in an amount of at least about ten moieties of water of hydration per formula unit of the super hydrate substance, which matrix is a MOP cement, a MOC cement, or a MOS cement; said mineral-foam being a solid foam in a form of a panel, a panel block, or a tile.

2. The article of claim 1, which has at least one tongue provision and/or at least one groove provision.

3. The article of claim 1, wherein at least one support member is at least partially embedded in the mineral-foam solid foam.

4. The article of claim 3, wherein a salt-stable latex polymer is dispersed throughout the inorganic cementitious matrix.

5. The article of claim 4, wherein the at least one support member includes at least one open web, thermally insulating support member.

6. The article of claim 5, wherein the solid foam is a closed cell foam; the at least one support member includes a plurality of open web, thermally insulating galvanized steel studs; and the article is in a form of a wall or ceiling having the mineral-foam composition as a laterally extending core, with an inner face of drywall separated from the core by a cavity.

7. The article of claim 6, wherein the cavity contains utility(ies) and/or a polyurethane foam, and the article passes at least one of ASTM E-119, CAN/ULC-S101, CAN/ULC-S124 and ASTM E-84 testing.

8. The article of claim 1, wherein the super hydrate includes Ettringite.

9. The article of claim 8, wherein a salt-stable latex polymer is dispersed throughout the inorganic cementitious matrix.

10. The article of claim 1, wherein the solid foam is an open cell foam.

11. The article of claim 1, wherein the solid foam is a closed cell foam.

12. The article of claim 1, wherein a salt-stable latex polymer is dispersed throughout the inorganic cementitious matrix.

13. The article of claim 1, which is configured in a form of a vertical wall having the mineral-foam composition as a laterally extending core.

14. The article of claim 1, which has a dry density about from 17.5 to 100 pounds per cubic foot.

15. The article of claim 1, wherein the matrix includes the MOP cement.

16. The article of claim 1, wherein the matrix includes the MOC cement.

17. The article of claim 1, wherein the matrix includes the MOS cement.

18. An article of manufacture comprising a cured solid, light-weight, fire-resistant mineral-foam, which includes an inorganic cementitious matrix and at least one metal hydrate that is a super hydrate substance, in which water is present with the substance in an amount of at least about ten moieties of water of hydration per formula unit of the super hydrate substance; wherein:
   a salt-stable latex polymer is dispersed throughout the inorganic cementitious matrix; and
   said mineral-foam is a solid foam in a form of a panel, a panel block, or a tile, in which at least one support member, which includes at least one open web, thermally insulating support member, is partially embedded in the mineral-foam solid foam.

19. An article of manufacture comprising a cured solid, light-weight, fire-resistant mineral-foam, which includes an inorganic cementitious matrix and at least one metal hydrate that is a super hydrate substance, in which water is present with the super hydrate substance in an amount of at least about ten moieties of water of hydration per formula unit of the substance, wherein the super hydrate is present at about from 5 to 55 percent by weight of the cured solid, light-weight, fire-resistant mineral-foam.

20. The article of claim 19, wherein the super hydrate is present at about from 20 to 55 percent by weight of the cured solid, light-weight, fire-resistant mineral foam.

* * * * *